United States Patent
La Rosa et al.

(10) Patent No.: US 11,405,223 B2
(45) Date of Patent: *Aug. 2, 2022

(54) DEVICE OF PHYSICALLY UNCLONABLE FUNCTION WITH TRANSISTORS, AND MANUFACTURING METHOD

(71) Applicants: STMicroelectronics (Crolles 2) SAS, Crolles (FR); STMicroelectronics (Rousset) SAS, Rousset (FR)

(72) Inventors: Francesco La Rosa, Rousset (FR); Marc Mantelli, Fuveau (FR); Stephan Niel, Meylan (FR); Arnaud Regnier, Les Taillades (FR)

(73) Assignees: STMICROELECTRONICS (ROUSSET) SAS, Rousset (FR); STMICROELECTRONICS (CROLLES 2) SAS, Crolles (FR)

( * ) Notice: Subject to any disclaimer, the term of this patent is extended or adjusted under 35 U.S.C. 154(b) by 232 days.

This patent is subject to a terminal disclaimer.

(21) Appl. No.: 16/783,631

(22) Filed: Feb. 6, 2020

(65) Prior Publication Data
US 2020/0274722 A1    Aug. 27, 2020

(30) Foreign Application Priority Data
Feb. 22, 2019   (FR) ...................... 1901792

(51) Int. Cl.
*H04L 9/32* (2006.01)
*G06F 21/60* (2013.01)
(Continued)

(52) U.S. Cl.
CPC .......... *H04L 9/3278* (2013.01); *G06F 21/602* (2013.01); *G06F 21/72* (2013.01);
(Continued)

(58) Field of Classification Search
CPC ..... H04L 9/3278; G06F 21/602; G06F 21/72; G11C 16/0441; G11C 16/10; G11C 16/28; G11C 16/30
(Continued)

(56) References Cited

U.S. PATENT DOCUMENTS 5,268,320 A  * 12/1993  Holler .................. G06N 3/0635
                                                                 438/591
10,833,027 B2   11/2020  Lisart et al.
(Continued)

OTHER PUBLICATIONS

Herder, Charles, Physical Unclonable Functions and Applications: A Tutorial, 2014 (Year: 2014).*
(Continued)

*Primary Examiner* — Eleni A Shiferaw
*Assistant Examiner* — Muhammed Jamil Rahman
(74) *Attorney, Agent, or Firm* — Slater Matsil, LLP

(57) ABSTRACT

In accordance with an embodiment, a physically unclonable function device includes a set of transistor pairs, transistors of the set of transistor pairs having a randomly distributed effective threshold voltage belonging to a common random distribution; a differential read circuit configured to measure a threshold difference between the effective threshold voltages of transistors of transistor pairs of the set of transistor pairs, and to identify a transistor pair in which the measured threshold difference is smaller than a margin value as being an unreliable transistor pair; and a write circuit configured to shift the effective threshold voltage of a transistor of the unreliable transistor pair to be inside the common random distribution.

20 Claims, 9 Drawing Sheets

(51) Int. Cl.
  *G06F 21/72* (2013.01)
  *G11C 16/04* (2006.01)
  *G11C 16/10* (2006.01)
  *G11C 16/28* (2006.01)
  *G11C 16/30* (2006.01)
(52) U.S. Cl.
  CPC .......... *G11C 16/0441* (2013.01); *G11C 16/10* (2013.01); *G11C 16/28* (2013.01); *G11C 16/30* (2013.01)
(58) Field of Classification Search
  USPC ........................................................ 713/189
  See application file for complete search history.

(56) References Cited

U.S. PATENT DOCUMENTS

| | | | | |
|---|---|---|---|---|
| 2008/0068892 | A1* | 3/2008 | Hosono | G11C 16/3418 365/185.2 |
| 2018/0277496 | A1* | 9/2018 | Lisart | H01L 23/576 |
| 2019/0139612 | A1* | 5/2019 | Kim | G11C 29/50004 |
| 2020/0035624 | A1* | 1/2020 | Marinet | G11C 16/14 |
| 2020/0105356 | A1* | 4/2020 | Kulkarni | H04L 9/3278 |
| 2020/0274723 | A1* | 8/2020 | La Rosa | G11C 16/30 |

OTHER PUBLICATIONS

Rekha Govindaraj ,Emerging Non-Volatile Memory Technologies for Computing and Security (Year: 2018).*

Bhargava, Mudit et al., "A High Reliability PUF Using Hot Carrier Injection Based Response Reinforcement", SpringerLink, Cryptographic Hardware and Embedded Systems—CHES 2013, vol. 8086, Aug. 20-23, 2013, 18 pages.

Bohm, Christoph et al., "A Reliable Low-area Low-power PUF-based Key Generator", UPCommons, Global access to UPC Knowledge, 6th Conference on Trustworthy Manufacturing and Utilization of Secures Devices (TRUDEVICE 2016) Universitat Politecnica De Catalunya Barcelonatech, Nov. 14-16, 2016, 6 pages.

Cai, Yu et al., "Error Patterns in MLC NAND Flash Memory: Measurement, Characterization, and Analysis", IEEE Design, Automation & Test in Europe Conference & Exhibition, Mar. 12-16, 2012, 6 pages.

Courbon, Frank et al., "Direct Charge Measurement in Floating Gate Transistors of Flash EEPROM using Scanning Electron Microscopy", Semantic Scholar, Materials Science, doi:10.17863/cam.7629, Nov. 6-10, 2016, 9 pages.

Dhar, Rudra Sankar "Direct Charge Measurements to read back stored data in nonvolatile memory devices using scanning capacitance microscopy", J. Vac. Sci. & Technol., B, 31, 061801, https://doi.org/10.1116/1.4825200, Oct. 15, 2013, 7 pages.

Dhar, Rudra S., et al., "Read Back of Stored Data in Non Volatile Memory Devices by Scanning Capacitance Microscopy", ResearchGate, Mater. Res. Soc. Symp. Proc., vol. 1527, Mar. 20, 2013, 8 pages.

Islam, Md Nazmul et al., "On Enhancing Reliability of Weak PUFs via Intelligent Post-Silicon Accelerated Aging", IEEE Transactions on Circuits and Systems—I: Regular Papers, vol. 65, No. 3, Mar. 2018, 10 pages.

* cited by examiner

DEVICE OF PHYSICALLY UNCLONABLE FUNCTION WITH TRANSISTORS, AND MANUFACTURING METHOD

This application claims priority to French Patent Application No. 1901792, filed on Feb. 22, 2019, which application is hereby incorporated herein by reference.

TECHNICAL FIELD

Implementations and embodiments of the invention relate to physically unclonable functions (PUFs), in particular in structures comprising transistors.

BACKGROUND

A physically unclonable function allows a unique unpredictable code that depends on random physical attributes to be generated automatically. Thus, it is very difficult, if not impossible to clone such a function.

On the one hand, it is desirable for physically unclonable functions to be robust enough for them not to vary in particular over time, following repeated use or in case of temperature variations. On the other hand, it is desirable for the random variations in the physical attributes to be easily identifiable, in order to make it possible to unequivocally discriminate between various data. Furthermore, it is desirable for the production of physically unclonable functions to require no or few dedicated fabrication steps.

The unique unpredictable codes typically comprise a sequence of random data and are mainly used as encryption keys. These data are typically secret.

This being so, techniques exist, in particular techniques employing scanning capacitance microscopy (SCM) or scanning electron microscopy (SEM), that are capable of extracting the secret data, i.e. capable of reading the data by measurement, inspection and/or analysis.

This is particularly the case with conventional structures that aim to achieve robust data retention and data readability. Specifically, conventional techniques, which increase the capacity to retain and to discriminate between data for read-out, generally also increase the capacity of extraction techniques to discriminate between the data.

SUMMARY

In accordance with an embodiment, a physically unclonable function device includes a set of transistor pairs, transistors of the set of transistor pairs having a randomly distributed effective threshold voltage belonging to a common random distribution; a differential read circuit configured to measure a threshold difference between the effective threshold voltages of transistors of transistor pairs of the set of transistor pairs, and to identify a transistor pair in which the measured threshold difference is smaller than a margin value as being an unreliable transistor pair; and a write circuit configured to shift the effective threshold voltage of a transistor of the unreliable transistor pair to be inside the common random distribution.

In accordance with another embodiment, a method includes providing a set of transistor pairs, wherein effective threshold voltages of transistors of the set of transistor pairs are randomly distributed according to a common random distribution; measuring a threshold difference between effective threshold voltages of the transistors of the set transistor pairs, and identifying a transistor pair of the set of transistor pairs in which the measured threshold difference is smaller than a margin value as being an unreliable transistor pair; and shifting the effective threshold voltage of the transistor of the unreliable transistor pair to be within the common random distribution.

In accordance with a further embodiment, an integrated circuit includes a plurality of transistor pairs, wherein a first transistor of each transistor pair of the plurality of transistor pairs is coupled to a first bit line, and a second transistor of each transistor pair of the plurality of transistor pairs is coupled to a second bit line, and transistors of the plurality of transistor pairs have a randomly distributed effective threshold voltage according to a common random distribution; a read circuit having a first input coupled to the first bit line and a second input coupled to the second bit line, wherein the read circuit is configured to measure a threshold difference between the first transistor and the second transistor of each transistor pair of the plurality of transistor pairs, and compare the measured threshold difference with a predetermined threshold; and a write circuit coupled to gates of the first transistor and the second transistor of each transistor pair of the plurality of transistor pairs, wherein the write circuit is configured to shift the effective threshold voltages of the first transistor and the second transistor of each transistor pair to cause the measured threshold difference to be greater than the predetermined threshold and within the common random distribution.

BRIEF DESCRIPTION OF THE DRAWINGS

Other advantages and features of the invention will become apparent on examining the detailed description of completely non-limiting implementations and embodiments, and the appended drawings, in which.

DETAILED DESCRIPTION OF ILLUSTRATIVE EMBODIMENTS

Figure 1A:
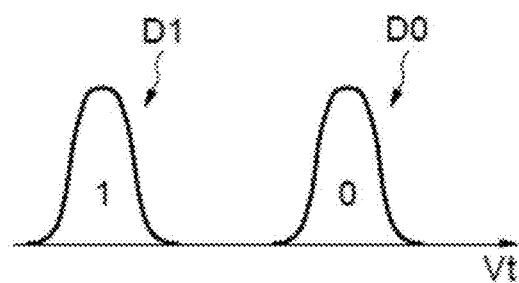
FIG. 1A illustrates a threshold distribution for a memory.

Implementations and embodiments of the invention relate to physically unclonable functions (PUFs), in particular in structures comprising transistors.

According to one embodiment, the differential read circuit is furthermore configured to read a logic state of a pair of transistors, which logic state is defined by a difference, between the values of the effective threshold voltages of the pair, larger than the margin value.

According to one embodiment, the write circuit is configured to shift the effective threshold voltage of a transistor of each unreliable pair so as to increase the difference, between the effective threshold voltages, above the margin value.

According to one embodiment, the write circuit is configured to shift the effective threshold voltage of a transistor by generating conditions for hot carrier injection, so as to trap charge in a gate dielectric of the transistor.

Advantageously, the write circuit, to shift the effective threshold voltage of a transistor, is configured to generate a succession of write pulses each generating the conditions for hot carrier injection.

Advantageously, the differential read circuit is configured to perform a margin verification between certain at least of the write pulses, the margin verification comprising comparing the difference between the values of the effective threshold voltages of the pair of transistors with the margin value.

According to one embodiment, the logic states of the set of pairs of transistors are intended to form a sequence of random data.

An integrated circuit may comprise a physically-unclonable-function device such as defined in the latter embodiment, and an encryption device configured to encrypt data using a key, the key advantageously comprising the sequence of random data.

According to another aspect, a process is provided, the process comprising a production of a physically unclonable function, the production comprising: fabricating a set of pairs of transistors, intended to have the same threshold voltage; a random dispersion of the effective values of the threshold voltages of the transistors forming a common random distribution of the threshold voltages of the transistors; measuring the difference between the effective threshold voltages of the pairs of transistors, and identifying what are called unreliable pairs of transistors the difference between the effective threshold voltages of which is smaller than a margin value; and shifting the effective threshold voltage of a transistor of each unreliable pair in a controlled and limited way so that the shifted threshold voltage remains inside the common random distribution.

According to one embodiment, the process furthermore comprises reading a logic state of a pair of transistors, which logic state is defined by a difference, between the values of the effective threshold voltages of the pair, larger than the margin value.

For example, the shifting comprises increasing the difference, between the effective threshold voltages of the transistors of the unreliable pairs, above the margin value.

According to one implementation, the shifting of the effective threshold voltage of a transistor comprises generating conditions for hot carrier injection, and trapping charge in a gate dielectric of the transistor.

Advantageously, the shifting of the effective threshold voltage of one of the transistors comprises generating a sequence of write pulses that each generates the conditions for hot carrier injection.

Advantageously, the shifting comprises a margin verification between certain at least of the write pulses, the margin verification comprising measuring the difference between the values of the effective threshold voltages of the pair of transistors and comparing the measured difference with the margin value.

According to one implementation, the logic states of the set of pairs of transistors are intended to form a sequence of random data.

An encryption method may advantageously comprise encrypting data using a key, where the key includes the sequence of random data obtained using a process such as defined by the latter implementation.

FIG. 1A illustrates a conventional technique aiming to achieve robust data retention and data readability, in which technique data are defined by levels of transistor threshold voltages Vt. First transistors have a threshold voltage Vt belonging to a low-level distribution D1 allowing a first logic value, "1" for example, to be defined. Second transistors have a threshold voltage Vt belonging to a high-level distribution Do allowing a second logic value, "0" for example, to be defined.

Figure 1B:
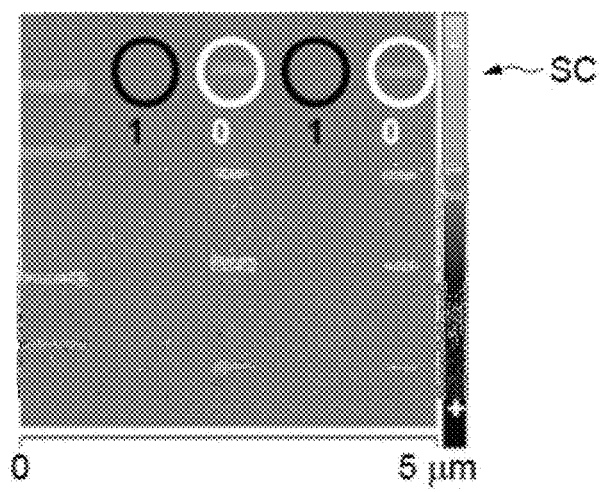
FIG. 1B illustrates a scanning capacitance micrograph SC of transistors storing data.

FIG. 1B illustrates a scanning capacitance micrograph SC of transistors storing data using the technique presented with reference to FIG. 1A. The stored sequence of data 1010 is easily extractable if the position of the transistors is known. Specifically, it is possible in the image SC to see the channel regions of the first transistors (the threshold voltage of which belongs to the low-level distribution D1) in the black circles, and the channel regions of the second transistors (the threshold voltage of which belongs to the high-level distribution Do) in the white circles. Of course this is problematic.

There is therefore a need to provide physically-unclonable-function structures that are robust with respect to exterior variations or ageing, and the data of which may be clearly discriminated between for read-out while being difficult to extract. It would furthermore be beneficial for the structures to be easy to produce in the existing technologies.

According to one aspect, a physically-unclonable-function device is provided, the device comprising a set of pairs of transistors intended to have the same threshold voltage but each having an effective threshold voltage belonging to a common random distribution, a differential read circuit configured to measure the difference between the effective threshold voltages of the pairs of transistors and to identify what are called unreliable pairs of transistors the difference between the effective threshold voltages of which is smaller than a margin value, and a write circuit configured to shift the effective threshold voltage of a transistor of each unreliable pair in a controlled and limited way so that the shifted threshold voltage remains inside the common random distribution.

Thus, the device according to this aspect benefits from the advantages of transistor data storage, i.e. a very good retention capacity, robustness, and fabrication processes and operating parameters that are perfectly characterized. Since the effective threshold voltages all belong to a common random distribution, the function is not only physically unclonable but furthermore impossible to extract using the microscopy techniques of the art. In the unreliable pairs, the shift of an effective threshold voltage allows the viability of this technique to be guaranteed, and in particular the distinction to be ensured between two effective threshold voltages that are potentially equal or very close initially.

The transistors may be MOS (metal-oxide-silicon) transistors in particular comprising a gate and a gate dielectric, or, in one particular embodiment, transistors comprising a floating gate and a control gate, which gates are superposed and mutually electrically coupled, and a gate dielectric. The gate dielectric is advantageously capable of trapping charge by hot carrier injection.

Figure 2:
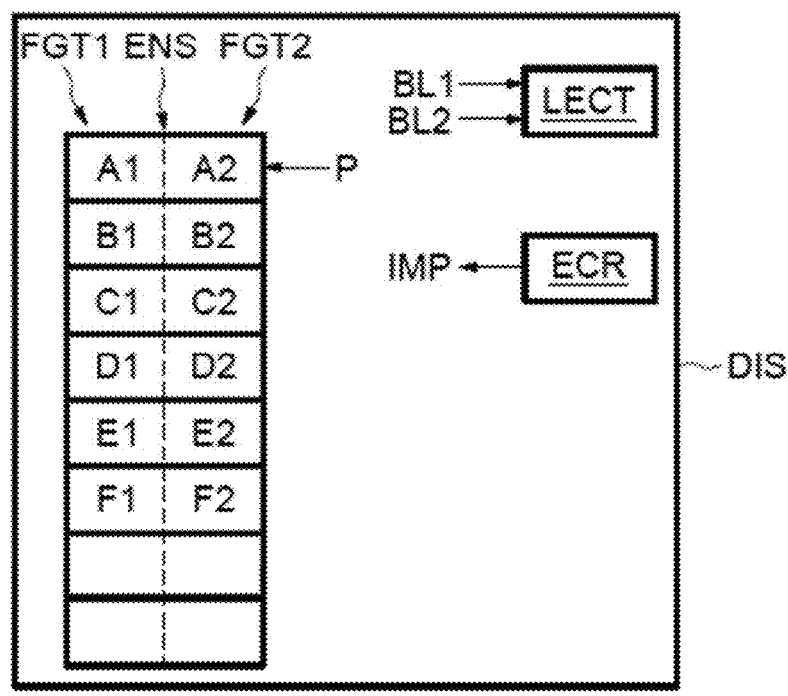
FIG. 2 illustrates an example embodiment of the invention.

FIG. 2 shows an example embodiment of a physically-unclonable-function device DIS. The device DIS comprises a set ENS of pairs P of transistors OTP1, OTP2.

The transistors conventionally comprise a source region and a drain region that are implanted in a semiconductor body, a channel region in the body between the source and drain regions, and an electrically conductive gate region insulated from the channel region by a gate dielectric. Typically, the gate dielectric comprises a formation of silicon oxide, or optionally of silicon nitride.

According to one example embodiment, the transistors have a floating-gate transistor structure (i.e. they are transistors the gate region of which comprises a floating gate electrically insulated from the channel region and electrically insulated from a control gate that surmounts it), in which transistors the floating gate and the control gate are mutually electrically connected.

The threshold voltage of a transistor is the voltage, between the source region and the control gate, from which the channel region is depleted and becomes conductive.

A logic state defined by the level of the threshold voltage of the transistor may be stored in such a transistor. To modify the level of the threshold voltage of a produced transistor, it is possible to trap charge in the gate dielectric, in particular by hot carrier injection.

The transistors OTP1, OTP2 of the set ENS are intended to have the same threshold voltage.

This being so, the effective threshold voltages, i.e. the actual values of the threshold voltages, vary slightly according to a random dispersion, for example due to physical fabrication variables. This type of dispersion is commonplace and known per se. The effective threshold voltages of the transistors referenced OTP1 of each pair are referenced A1-F1 and the effective threshold voltages of the transistors referenced OTP2 of each pair are referenced A2-F2.

The transistors of the example embodiment in which the transistor structure is a floating-gate structure, the gates being electrically connected, have, by nature, a greater variability in response to these variables and therefore a broader distribution than other types of electronic components, for example resistors or MOS (metal-oxide-silicon) transistors.

Thus, the transistors OTP1, OTP2 of the set ENS each have an effective threshold voltage A1-F1, A2-F2 belonging to a common random distribution.

In particular, the transistors OTP1, OTP2 may advantageously be kept in a virgin state, i.e. no charge is initially trapped in their gate dielectrics.

Figure 3:
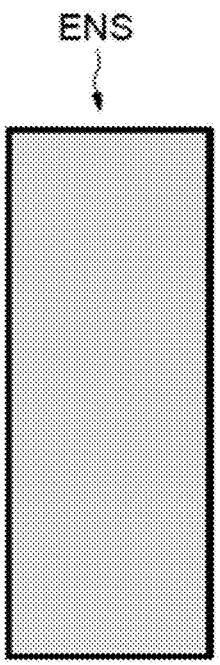
FIG. 3 illustrates an example embodiment of the invention.

FIG. 3 illustrates a scanning capacitance micrograph of the transistors belonging to the set ENS. Each transistor has its own effective threshold voltage within a distribution of virgin-transistor threshold voltages Vteff. This being so, it is impossible to see any distinction between the values of the threshold voltages in this image.

Referring once again to FIG. 2, the device DIS comprises a differential read circuit LECT configured to measure the difference between the effective threshold voltages of the pairs P of transistors OTP1, OTP2.

The differential read circuit LECT comprises two differential inputs to which the transistors OTP1, OTP2 of each pair P are respectively coupled, in particular via respective bit lines BL1, BL2.

Figure 4:
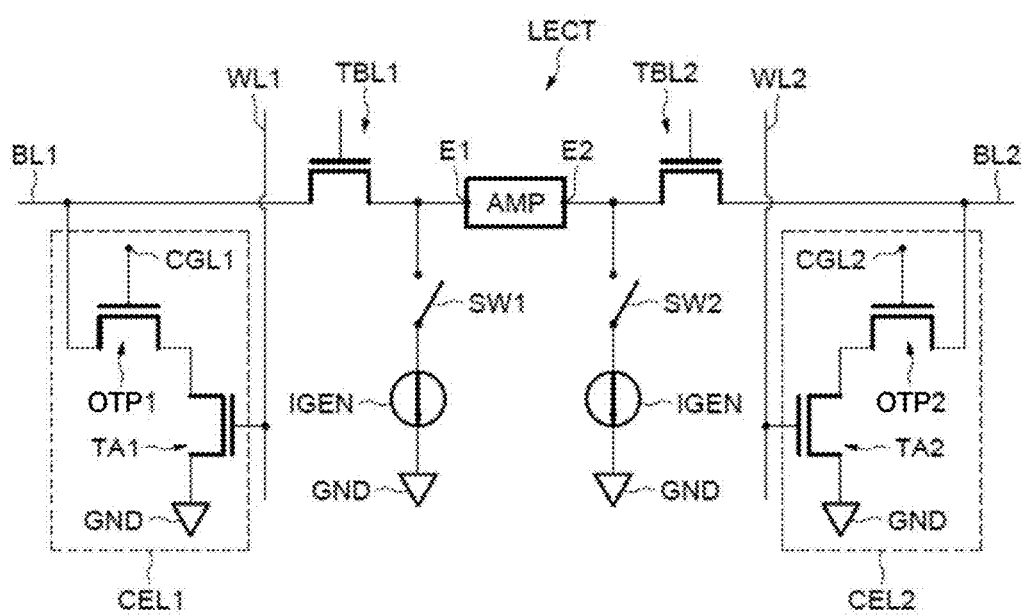
FIG. 4 illustrates an example embodiment of the invention.
Figure 5:
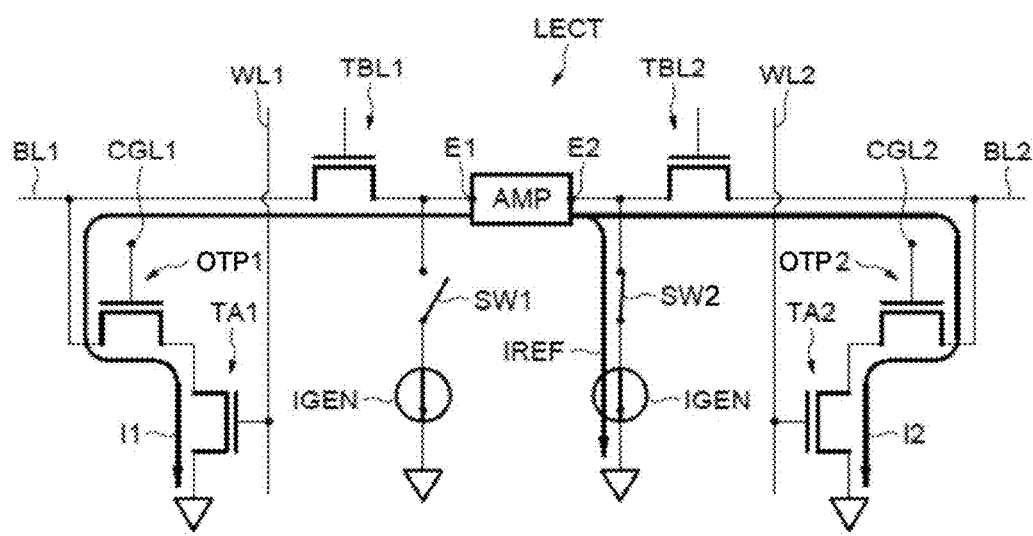
FIG. 5 illustrates an example embodiment of the invention.

In this regard, reference is now made to FIGS. 4 and 5. FIG. 4 shows an example of an embodiment of the differential read circuit LECT coupled to the transistors OTP1, OTP2 of one pair, via the respective bit lines BL1, BL2.

In this example, the transistors OTP1, OTP2 belong to respective memory cells CEL1, CEL2, in which an access transistor TA1, TA2 is connected to the source of the transistor OTP1, OTP2 via its drain and to ground GND via its source.

The access transistors TA1, TA2 are controlled via their gates by a signal transmitted over a respective word line WL1, WL2. As will become clear below, the word lines WL1, WL2 may optionally be common to one pair, i.e. electrically connected, or even formed by the same electrically conductive line.

The gates of the transistors OTP1, OTP2 are connected to a respective gate control line CGL1, CGL2. Likewise, the gate control lines CGL1, CGL2 may optionally be common to one pair of transistors, i.e. electrically connected, or even formed by the same electrically conductive line. The drains of the transistors OTP1, OTP2 are for their part connected to a respective bit line BL1, BL2.

The bit line BL1 allows one of the transistors OTP1 of the pair to be coupled to a first input E1 of a read amplifier AMP. The bit line BL2 allows the other transistor OTP2 of the pair to be coupled to a second input E2 of the read amplifier AMP.

The other transistors of the set ENS of pairs P are coupled to the read amplifier AMP in the same way, and respective input switches TBL1, TBL2 allow the bit lines BL1, BL2 of the pairs that it is desired to couple to the inputs E1, E2 to be selected.

Furthermore, the read circuit LECT comprises reference current generators IGEN that generate a reference current IREF drawn by the first input E1 or the second input E2, depending on positions of respective switches SW1, SW2.

FIG. 5 shows an example of an embodiment of the differential read circuit LECT in operation. The read amplifier AMP is configured to amplify a difference between the current passed by its first input E1 and the current passed by its second input E2. In this regard, the input switches TBL1, TBL2 are controlled so as to connect the bit lines BL1, BL2 of the desired pair of transistors.

The access transistor TA1, TA2 of each transistor OTP1, OTP2 is turned on by a voltage transmitted over the word lines WL1, WL2. Likewise, the transistors OTP1, OTP2 are controlled by a control voltage transmitted over the gate control lines CGL1, CGL2.

The transistor OTP1 of the pair is thus placed to flow a read current I1 from the first input E1 to ground GND. The other transistor OTP2 of the pair is likewise placed to flow a read current I2 from the second input E2 to ground GND.

Since the read current I1, I2 is representative of the effective threshold voltage of the respective transistor OTP1, OTP2, the difference between the currents I1, I2 is representative of the difference between the effective threshold voltages of the pairs of transistors OTP1, OTP2.

Thus, the differential read circuit LECT is capable of measuring the difference between the effective threshold voltages of the pairs of transistors OTP1, OTP2.

Furthermore, an additional current IREF, generated by one of the reference current generators IGEN, may be added to one of the currents I1, I2 passed by the inputs E1, E2 via control of the switches SW1, SW2. In the example shown, the switch SW2 is closed and the current IREF is added to the current I2 of the second input E2.

This allows a difference between the effective threshold voltages to be measured relative to a certain margin. The value of the margin corresponds to the current IREF, which is representative of a reference voltage deviation.

The margin value is in particular chosen depending on the precision of the differential read circuit LECT.

Figure 6:
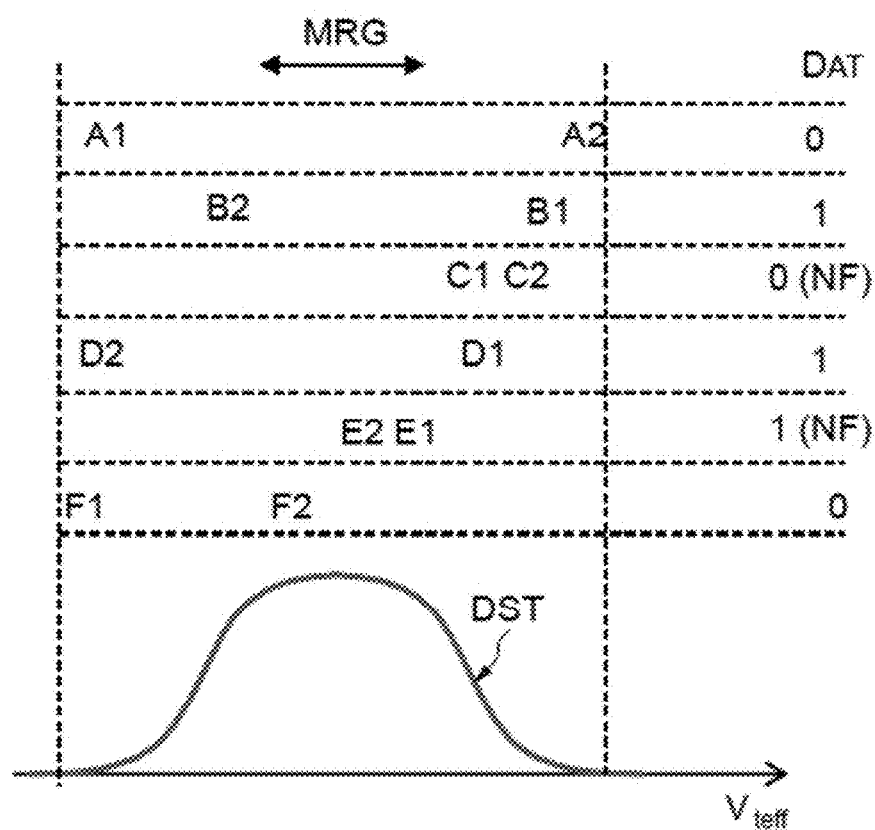
FIG. 6 illustrates an example embodiment of the invention.

Reference is now made to FIG. 6, which shows an example of various threshold-voltage values A1, B1, C1, D1, E1, F1 of one of the transistors OTP1 of each pair of the set ENS, and the threshold-voltage values A2, B2, C2, D2, E2, F2 of the respective other transistor OTP2 of each pair. The values A1-F1, A2-F2 all belong to the common random distribution DST of effective threshold voltages Vteff.

The differential read circuit LECT according to one example embodiment, for example such as described with reference to FIGS. 4 and 5, is also configured to read a logic state DAT of each pair of transistors OTP1, OTP2. The logic state DAT is defined by the difference between the values of the effective threshold voltages of the pair larger than the margin value MRG.

For example, if X1>X2+MRG, then DAT=1, and if X2>X1+MRG, then DAT=0, with X1 any one of the values A1-F1 and X2 any one of the values A2-F2, respectively.

Thus, logic states are obtained in a physically unclonable way using the random deviation of the values of the effective threshold voltages of the two transistors of a pair. Given that these effective threshold voltages are close and belong to the common random distribution DST, it is impossible by microscopic inspection to discriminate between two stored data.

It will be noted that in the figure certain pairs of threshold-voltage values, C1 C2 and E1 E2, may be so close as to have a deviation smaller than the margin value MRG. The pairs of transistors having these pairs of values are said to be unreliable pairs NF.

Referring once more to FIG. 2, the differential read circuit LECT is configured to identify pairs P of transistors that belong to so-called unreliable pairs NF, for example using a differential measurement such as described above with reference to FIGS. 4 and 5. A pair P of transistors OTP1, OTP2 is said to be unreliable if the difference between the effective threshold voltages of the transistors is smaller than a margin value, for example the margin value MRG such as described above with reference to FIGS. 4 and 5.

The device DIS lastly comprises a write circuit ECR capable in particular of generating write pulses IMP.

The write pulses IMP may comprise applying, between the gate and the drain of the transistors, a potential difference sufficient to cause injection of charge into the gate dielectric, via hot carrier injection.

Hot carrier injection is well known in the art. Briefly, conditions leading to hot carrier injection may be obtained by applying high voltages to the drain and gate regions of the transistor. A stress may also be applied to the gate dielectric. For example, applying a drain voltage of $V_D$=4.5 V and a gate voltage of $V_G$=8 V allows negative charge to be trapped in a gate dielectric consisting of silicon dioxide $SiO_2$ by hot carrier injection. Trapping negative charge in the gate dielectric increases the value of the threshold voltage of the transistor.

Thus, contrary to conventional techniques that create two populations of transistors the threshold voltages of which are rigorously different (for example such as illustrated in FIG. 1A), the write pulses IMP are controlled and limited and allow the threshold voltage to be shifted sufficiently slightly to allow the new shifted threshold voltage to be reasonably considered to belong to the same common random distribution.

The write circuit ECR, optionally in collaboration with the read circuit LECT, may according to one example embodiment be configured to generate the write pulses according to the implementation described below with reference to FIG. 10.

Figure 7:
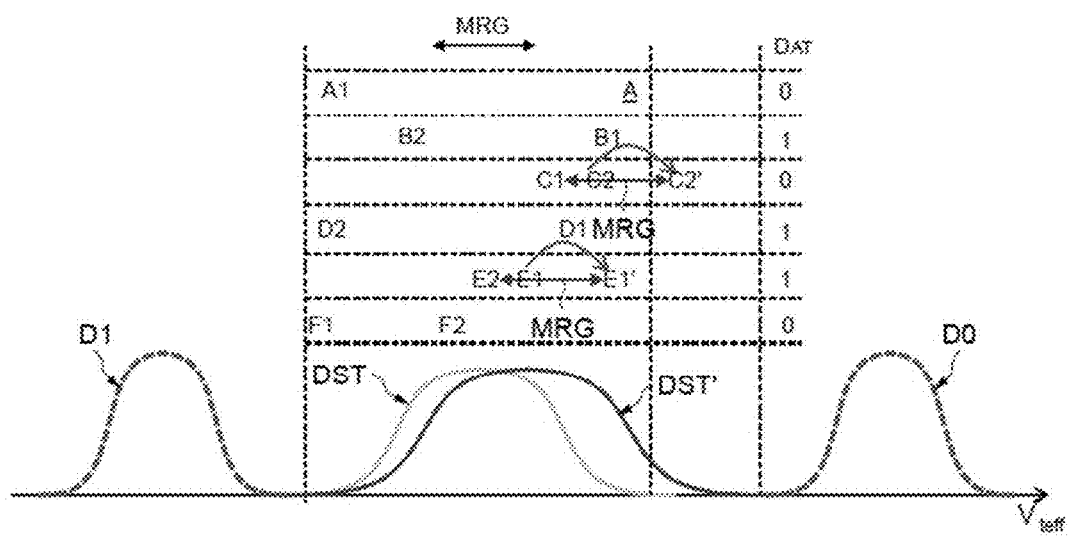
FIG. 7 illustrates an example embodiment of the invention.

In this regard, reference is made to FIG. 7, which returns to the example shown in FIG. 6, the effective threshold voltages C2 and E1 of one of the transistors of each unreliable pair NF having been shifted to shifted values C2', E1'.

The write circuit ECR is configured to shift the effective threshold voltage C2, E1 of a transistor of each unreliable pair NF so as to increase the difference, between the effective threshold voltages, above the margin value MRG. This allows a logic state DAT defined by a difference, between the values of the effective threshold voltages of the pair, larger than the margin value MRG to be able to be reliably read in pairs identified as being unreliable pairs NF.

Of course, from a theoretical point of view, this implies a slight modification of the initial distribution DST into a shifted distribution DST'. This being so, it is reasonable to consider that the shifted values C2' and E1' belong to the initial common distribution, i.e. the common random distribution DST obtained on fabrication. Specifically, in comparison to the distributions of the low-level threshold voltages D1 and high-level threshold voltages Do (also corresponding to FIG. 1A), the distributions DST and DST' are very similar and considered to be identical.

In other words, the write circuit ECR is configured to shift the effective threshold voltage of a transistor of each unreliable pair NF in a controlled and limited way inside the common random distribution DST.

In any case, the values of the shifted threshold voltages are considered to be located inside the common random distribution DST provided that it is impossible to distinguish between them using scanning microscopy techniques.

The populations of transistors of the low-level and high-level threshold-voltage distributions D1 and D2 may be distinguished between by scanning microscopy, but it is impossible to distinguish between the populations of transistors of the initial and shifted distributions DST and DST'.

Figure 8:
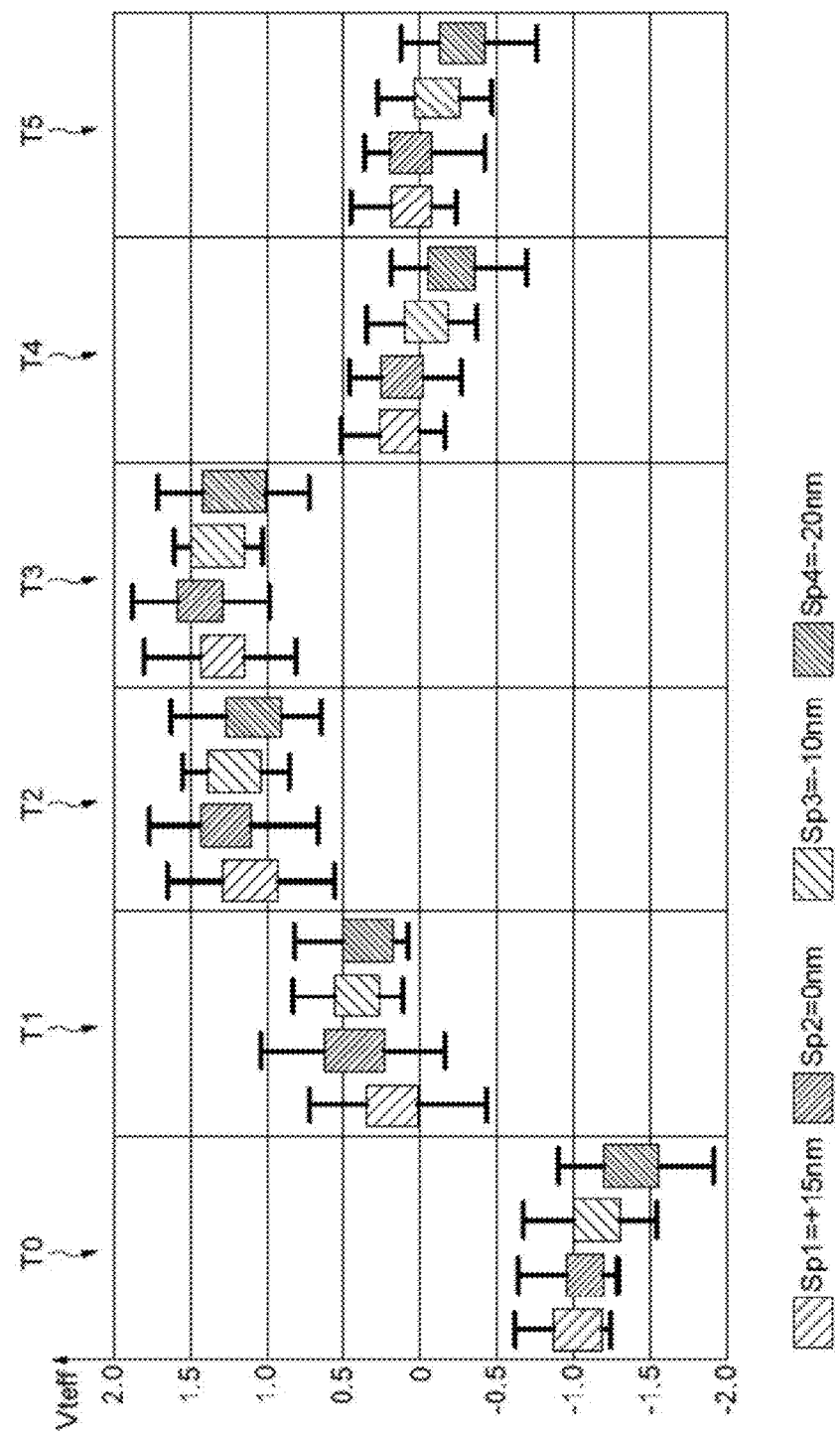
FIG. 8 illustrates an example embodiment of the invention.

FIG. 8 is a box plot showing threshold-voltage-value results, for shifts achieved under various conditions. The boxes of the plot are bounded by the values of the first quartile and third quartile and are intersected by the median. The segments at the ends extend as far as to extreme values, potentially with aberrant data excluded. The results of measurements of threshold voltages Vteff are shown for four populations of transistors Sp1, Sp2, Sp3, Sp4 by respective boxes, and for six measurement contexts T0, T1, T2, T3, T4, T5. The populations Sp1, Sp2, Sp3, Sp4 correspond to structural variants of the transistors. The measurement context To corresponds to transistors in their initial production states. In the initial state, each population has effective threshold voltages that are dispersed in a random distribution, about −1.0 V to −1.5 V.

The measurement context T1 corresponds to transistors that have been subjected to a voltage stress for 0.1 seconds. The voltage-stress conditions allow hot carriers to be injected into the gate dielectrics of the transistors. Thus, charge is trapped in the gate dielectric and the effective threshold voltage of the transistor is shifted.

The stress conditions for example correspond to a drain voltage of $V_D$=4.5 V and to a gate voltage of $V_G$=8 V. In the example embodiment described above with reference to FIGS. 4 and 5, a voltage of 1 V is applied to the gate of the transistors TA in order to saturate the transistors TA and obtain optimal stress conditions, in particular in terms of hot-carrier population in the drain regions of the transistors TA. The threshold voltages shifted under these conditions are centered on 0.0 V to 0.5 V.

The measurement contexts T2 and T3 correspond to the same stress conditions applied for respective durations of 1.0 s and 2.0 s. The measured values show an additional shift of the threshold voltage following 1 second of stress, to substantially about 1.0 V to 1.5 V; and no notable variation between 1 second and 2 seconds of stress. The measurement contexts T4 and T5 correspond to transistors that have been subjected to the stress conditions of contexts T2 or T3 and to respective anneals of 24 h and 72 h.

The values measured in contexts T4 and T5 are very similar, and show that the values after annealing are more uniform and have decreased. This being so, the decrease in the values does not mean that the initial threshold-voltage values are re-established, and they remain shifted with respect to the latter. The values of the threshold voltages after annealing are centered substantially on −0.5 V to 0.0 V.

The measurement contexts presented in relation to FIG. 8 are experimental measurements representative of the general behavior of the transistors in response to stress conditions.

Of course, the shifts of the effective threshold voltages achieved by the write circuit ECR in a controlled and limited way inside the common random distribution DST are less substantial than these experimental measurements.

Figure 9:
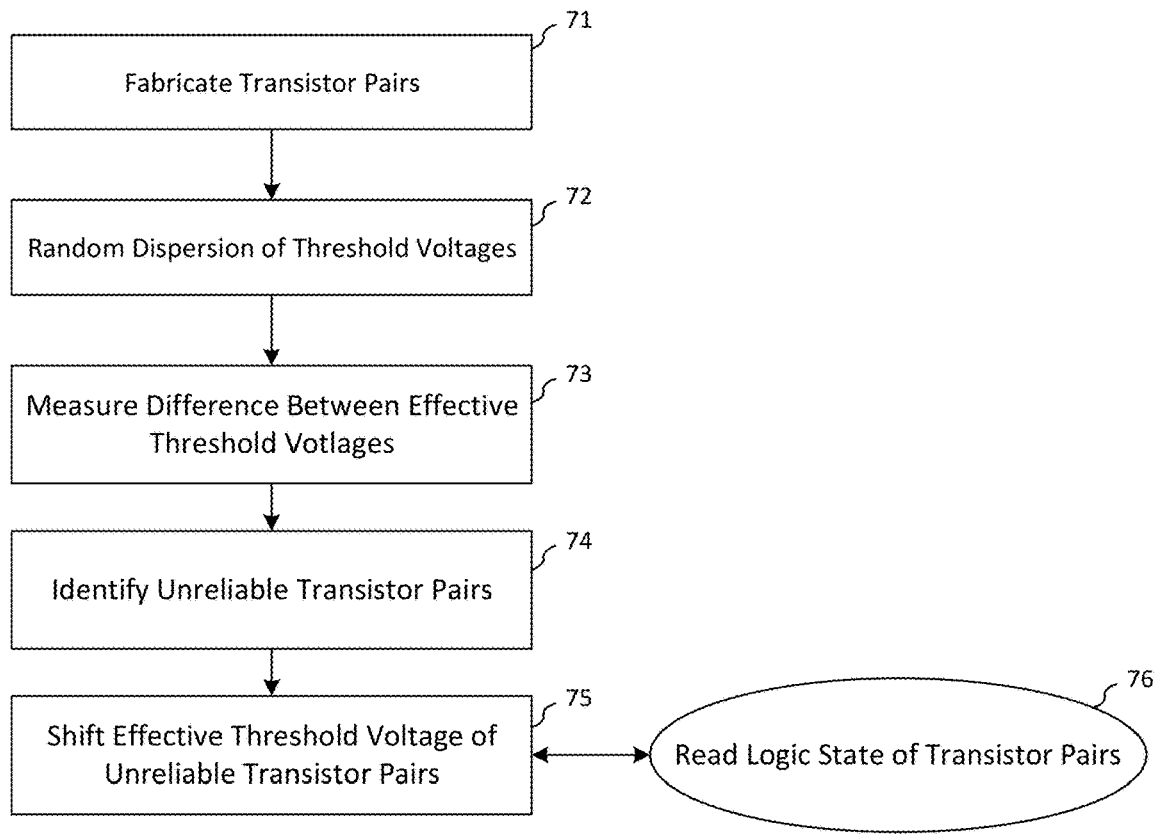
FIG. 9 illustrates an example implementation of the invention.

FIG. 9 shows an example of an implementation of a process in particular comprising producing a physically unclonable function. Certain references relate to FIGS. 2 to 8, which were described above.

The process comprises a step 71 of fabricating a set ENS of pairs P of transistors OTP1, OTP2. The fabrication of the transistors is identical so that the fabricated transistors are intended to have the same threshold voltage.

The process comprises a random dispersion 72 of the effective values of the threshold voltages Vteff of the transistors. The dispersion is in particular due to physical fabrication variables, and thus directly accomplished, at least partially, in the fabricating step 71. The dispersion of the effective values forms a common random distribution DST of the threshold voltages of the transistors of the set ENS.

It could be envisioned to implement, in a dedicated step or in the fabricating step 71, conditions intensifying the random dispersion of the threshold voltages.

The process comprises a step 73 of measuring the difference between the effective threshold voltages Vteff of the pairs of transistors, and an identification 74 of pairs of transistors that are said to be unreliable pairs NF, the difference between the effective threshold voltages of which is smaller than a margin value MRG.

Lastly, the process comprises shifting 75 the effective threshold voltage of a transistor of each unreliable pair NF in a controlled and limited way inside the common random distribution DST.

The shifting 75 is implemented so as to increase the difference, between the effective threshold voltages of the transistors of the unreliable pairs NF, above the margin value MRG.

Figure 10:
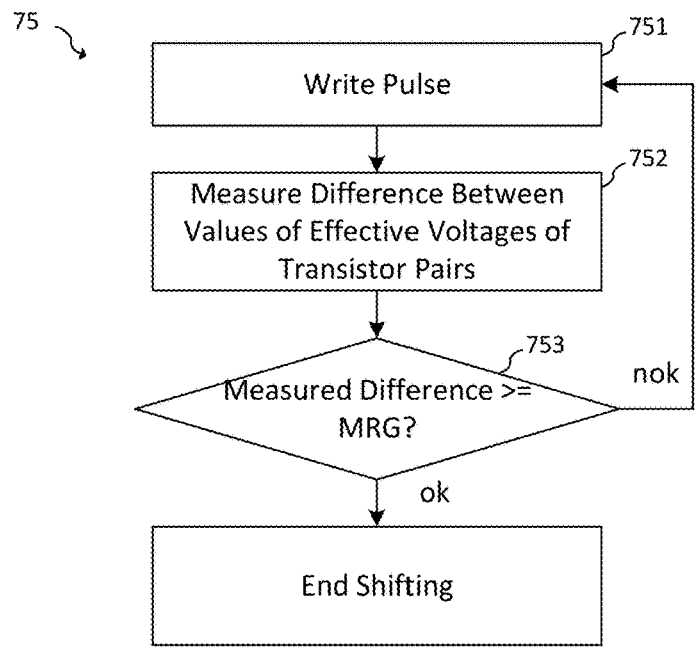
FIG. 10 illustrates an example implementation of the invention.

Reference is now made to FIG. 10, which illustrates an example of an implementation of the shifting 75. In this example, the shifting 75 of the effective threshold voltage comprises a succession of write pulses 751. Each write pulse 751 generates conditions that allow hot carrier injection to be obtained, in order to trap charge in the floating gate of the transistor the threshold voltage of which is to be shifted.

In the sequence, a margin verification (752, 753) is carried out between certain at least of the write pulses 751. The margin verification comprises measuring 752 the difference between the values of the effective threshold voltages of the pair of transistors, after the one or more write pulses 751, and then comparing 753 the measured difference with the margin value MRG.

If the measured difference 752 is smaller than the margin value MRG (nok), then a new cycle comprising a write pulse 751 and a margin verification 752, 753 is added to the sequence.

When the measured difference 752 is larger than or equal to the margin value MRG (ok), then the shifting 75 ends 754. By virtue of the margin verifications 752, 753 in the sequence of write pulses 751, the threshold voltages are shifted in a controlled and limited way in order not to achieve threshold-voltage values located outside of the common random distribution DST obtained on fabrication.

Referring once again to FIG. 9, the process furthermore comprises a step 76 of reading a logic state DAT of a pair of transistors, which logic state is defined by a difference, between the values of the effective threshold voltages Vteff, larger than the margin value MRG.

The logic states DAT thus formed in the set ENS of pairs P of transistors OTP1, OTP2 may for example be intended to form a sequence of random data.

Figure 11:
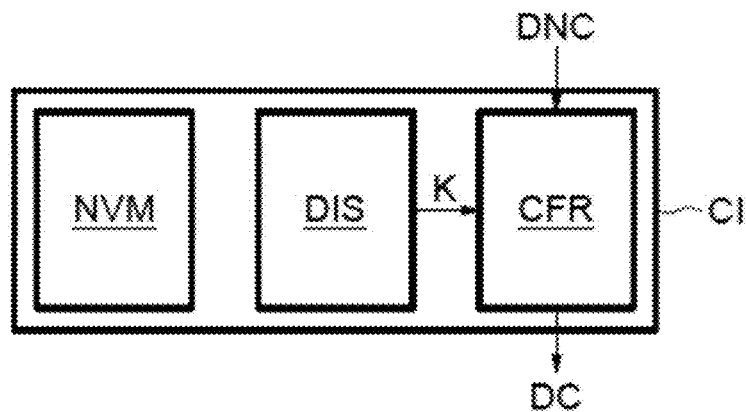
FIG. 11 illustrates an example embodiment of the invention.

FIG. 11 shows an integrated circuit CI comprising a physically-unclonable-function device DIS such as described above with reference to FIGS. 2 to 8, for example obtained using a process such as described above with reference to FIGS. 9 and 10.

In the device DIS, the logic states DAT of the set ENS of pairs P of transistors OTP1, OTP2 are therefore intended to form a sequence of random data.

In this example, the integrated circuit CI is capable of executing an encryption method comprising encrypting CFR data DNC using a key K, the key K comprising the sequence of random data formed and stored in the set ENS of pairs of transistors.

An encrypting circuit CFR, incorporated into the integrated circuit CI, is configured to encrypt the data DNC using the key K.

Furthermore, the integrated circuit CI may comprise a nonvolatile memory NVM, comprising memory cells each having a floating-gate transistor advantageously fabricated in the same fabricating step 71 as the set ENS of pairs P of transistors OTP1, OTP2. In this case, the transistors OTP1, OTP2 in the pairs P of the set ENS are obtained by subsequent electrical connection of the floating gates with the control gates of the floating-gate transistor structures thus fabricated.

In summary, a physically-unclonable-function technique in which a logic state is defined by the relative difference between two pieces of information belonging to the same distribution has been presented. The data cannot be extracted using prior-art methodologies: neither scanning capacitance microscopy (SCM) nor scanning electron microscopy (SEM). The technique does not necessarily require specific and dedicated processes.

Moreover, the invention is not limited to these embodiments but encompasses all the variants thereof, for example, even though the example embodiments described above with reference to FIGS. 4 and 5 relate to a current-mode differential read amplifier, the differential read-out may be performed in voltage-mode, or indeed, even though the direction of the shift illustrated in FIGS. 6 and 7 is an increase, a decrease may also be obtained by injecting charge of opposite sign.

What is claimed is:

1. A physically unclonable function device comprising:
a set of transistor pairs, transistors of the set of transistor pairs having a randomly distributed effective threshold voltage belonging to a common random distribution, wherein a first set of transistor pairs of the set of transistor pairs comprise logic states, and each logic state is one of a first logic state or a second logic state;
a differential read circuit configured to
measure a threshold difference between effective threshold voltages of transistors of transistor pairs of the set of transistor pairs,
identify a transistor pair in which the measured threshold difference is smaller than a margin value as being an unreliable transistor pair,
detect the first logic state when an effective threshold of a first transistor of a respective transistor pair of the set of transistor pairs is greater than a sum of an effective threshold of a second transistor of the respective transistor pair and a predetermined threshold, and
detect the second logic state when the effective threshold of the second transistor is greater than a sum of the effective threshold of the first transistor and the predetermined threshold; and
a write circuit configured to shift an effective threshold voltage of a transistor of the unreliable transistor pair to be inside the common random distribution.

2. The device according to claim 1, wherein the write circuit is configured to shift the effective threshold voltage of the transistor of the unreliable transistor pair to increase the threshold difference above the margin value.

3. The device according to claim 1, wherein the write circuit is configured to shift the effective threshold voltage of the transistor of the unreliable transistor pair by generating conditions for hot carrier injection to trap charge in a gate dielectric of the transistor of the unreliable transistor pair.

4. The device according to claim 3, wherein the write circuit is configured to generate the conditions for hot carrier injection by applying a succession of write pulses to the transistor of the unreliable transistor pair.

5. The device according to claim 4, wherein the differential read circuit is configured to perform a margin verification after at least one write pulse of the succession of write pulses, wherein performing the margin verification comprises comparing the measured threshold difference with the margin value.

6. The device according to claim 1, wherein a sequence of first logic states and second logic states detected by the differential read circuit form a sequence of random data.

7. An integrated circuit comprising:
the physically unclonable function device according to claim 6; and
an encryption device configured to encrypt data using a key, wherein the key comprises the sequence of random data.

8. A method, comprising:
providing a set of transistor pairs, wherein effective threshold voltages of transistors of the set of transistor pairs are randomly distributed according to a common random distribution, wherein a first set of transistor pairs of the set of transistor pairs comprise logic states, and each logic state is one of a first logic state or a second logic state;
measuring a threshold difference between effective threshold voltages of the transistors of the set of transistor pairs;
identifying a transistor pair of the set of transistor pairs in which the measured threshold difference is smaller than a margin value as being an unreliable transistor pair; and
shifting the effective threshold voltage of a transistor of the unreliable transistor pair to be within the common random distribution;
detecting the first logic state when an effective threshold of a first transistor of a respective transistor pair of the set of transistor pairs is greater than a sum of an effective threshold of a second transistor of the respective transistor pair and a predetermined threshold; and
detecting the second logic state when the effective threshold of the second transistor is greater than a sum of the effective threshold of the first transistor and the predetermined threshold.

9. The method according to claim 8, wherein the shifting comprises increasing the threshold difference of the unreliable transistor pair above the margin value.

10. The method according to claim 8, wherein the shifting of the effective threshold voltage of the transistor of the unreliable transistor pair comprises generating conditions for hot carrier injection to trap charge in a gate dielectric of the transistor of the unreliable transistor pair.

11. The method according to claim 10, wherein generating the conditions for hot carrier injection comprises applying a succession of write pulses that each generate the conditions for hot carrier injection.

12. The method according to claim 11, further comprising performing a margin verification after at least one write pulse of the succession of write pulses, wherein performing the margin verification comprises comparing the measured threshold difference with the margin value.

13. The method according to claim 8, further comprising, based on detecting the first logic state and detecting the second logic state, detecting a sequence of first logic states and second logic states.

14. The method according to claim 13, wherein the sequence of first logic states and second logic states form a sequence of random data.

15. The method of claim 14, further comprising encrypting data using a key, wherein the key comprises the sequence of random data.

16. The method of claim 8, further comprising fabricating the set of transistor pairs, wherein each transistor of the set of transistor pairs is fabricated to have a same nominal threshold voltage.

17. An integrated circuit comprising:
a plurality of transistor pairs, wherein
a first transistor of each transistor pair of the plurality of transistor pairs is coupled to a first bit line,
a second transistor of each transistor pair of the plurality of transistor pairs is coupled to a second bit line,
transistors of the plurality of transistor pairs have a randomly distributed effective threshold voltage according to a common random distribution,
a first set of transistor pairs of the plurality of transistor pairs comprise logic states, and
each logic state is one of a first logic state or a second logic state;
a read circuit having a first input coupled to the first bit line and a second input coupled to the second bit line, wherein the read circuit is configured to measure a threshold difference between the first transistor and the second transistor of each transistor pair of the plurality of transistor pairs, and compare the measured threshold difference with a predetermined threshold, detect the first logic state when an effective threshold of the first transistor is greater than a sum of an effective threshold of the second transistor and the predetermined threshold, and detect the second logic state when the effective threshold of the second transistor is greater than a sum of the effective threshold of the first transistor and the predetermined threshold; and a write circuit coupled to gates of the first transistor and the second transistor of each transistor pair of the plurality of transistor pairs, wherein the write circuit is configured to shift the effective threshold voltages of the first transistor and the second transistor of each transistor pair to cause the measured threshold difference to be greater than the predetermined threshold and within the common random distribution.

18. The integrated circuit of claim 17, wherein the read circuit comprises:

a read amplifier coupled to the first input and to the second input of the read circuit; and a reference current generator coupled to the first input or the second input, wherein the read circuit is configured to compare the measured threshold difference with the predetermined threshold by activating the reference current generator and measuring a voltage difference between the first input and the second input.

19. The integrated circuit of claim 17, wherein the write circuit is configured to shift the effective threshold voltage of the first transistor or the second transistor of each transistor pair by applying at least one write pulse to the respective first transistor or second transistor.

20. The integrated circuit of claim 17, further comprising an encryption circuit coupled to the plurality of transistor pairs, wherein the encryption circuit is configured to use the logic states of the plurality of transistor pairs as an encryption key.

* * * * *